Nov. 17, 1964  A. BLOCK  3,157,010
ABRADING ARTICLE
Filed Jan. 17, 1962  2 Sheets-Sheet 1
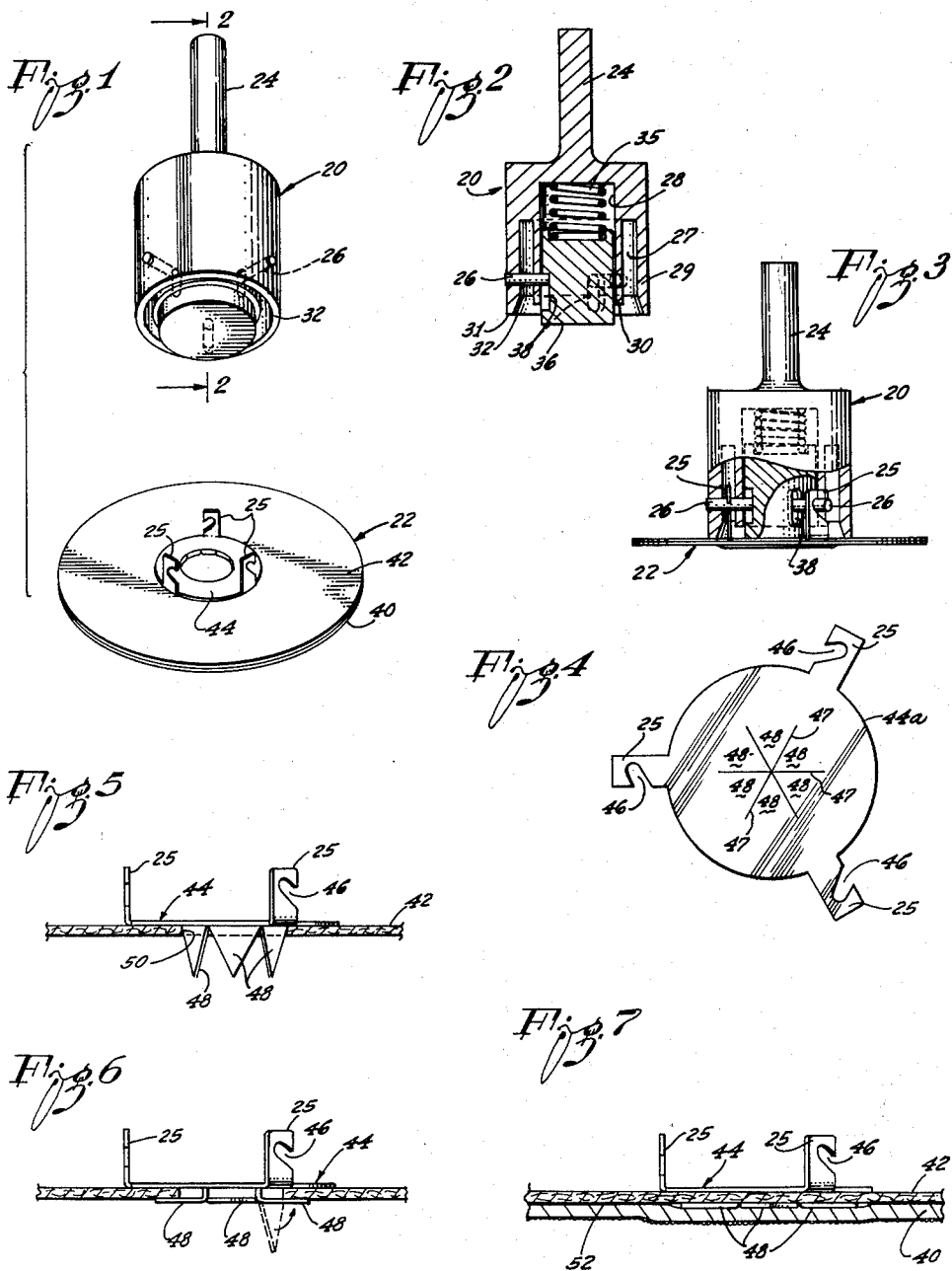
INVENTOR:
Aleck Block
Attorneys Nov. 17, 1964
A. BLOCK
3,157,010
ABRADING ARTICLE
Filed Jan. 17, 1962
2 Sheets-Sheet 2
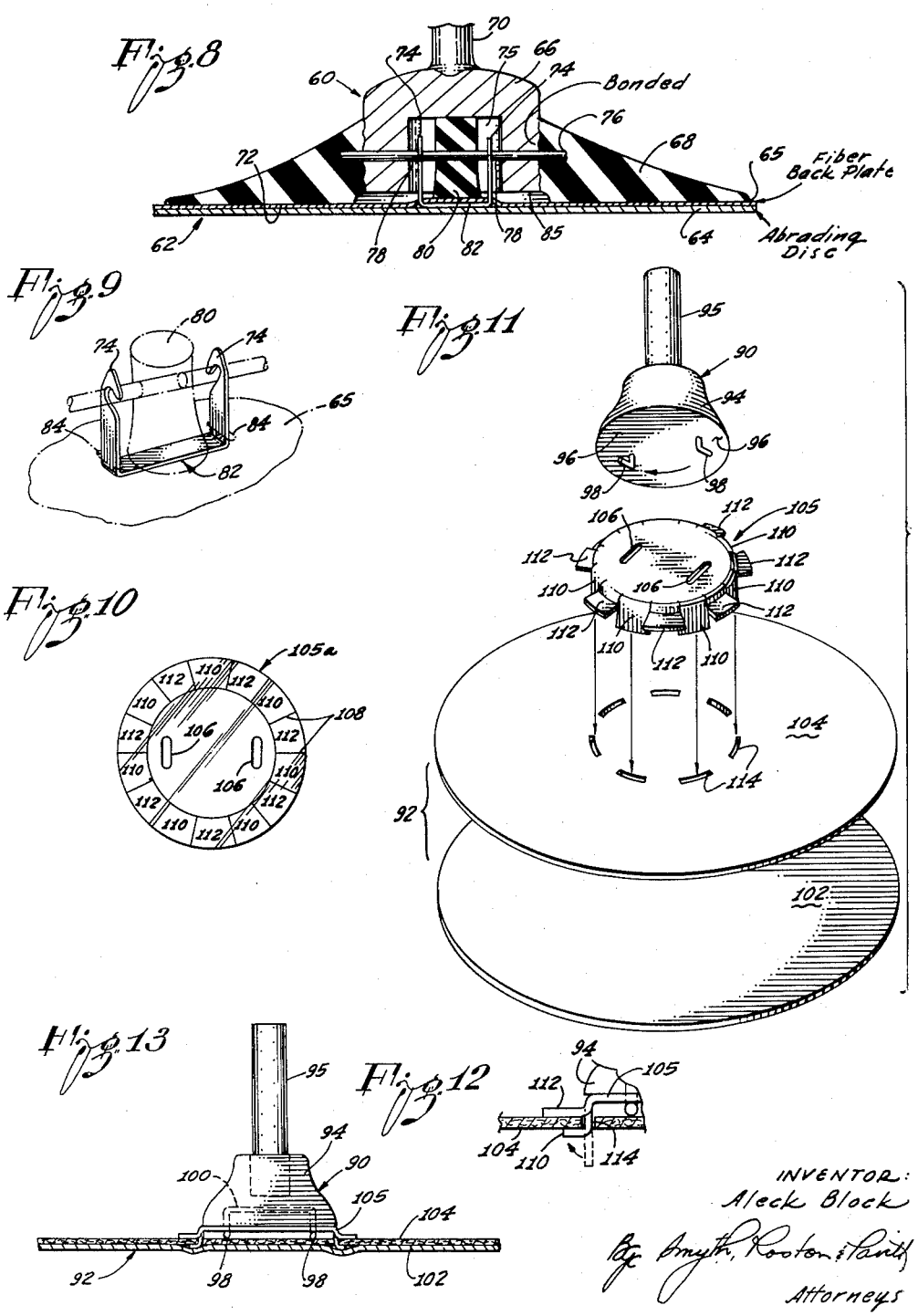

United States Patent Office 3,157,010
Patented Nov. 17, 1964

3,157,010
ABRADING ARTICLE
Aleck Block, Los Angeles, Calif., assignor to Merit Products, Inc., Los Angeles, Calif., a corporation of California
Filed Jan. 17, 1962, Ser. No. 166,893
17 Claims. (Cl. 51—377)

This invention relates to an abrasive device of the type comprising a rotary support with a working face and a replaceable abrasive disk releasably mounted on the working face. The invention is directed to the problem of providing such an abrasive disk of inexpensive construction provided with simple but efficient means for releasably mounting the disk on the working face of the rotary support.

Broadly described, the invention meets this problem of interrelating a disk member and a rotary support member by providing one of the two members with hook means, providing the other of the two members with engagement means for engagement by the hook means, and by further providing resilient means to create pressure between the two members to keep the hook means engaged.

A feature of the invention is the concept of providing a plurality of hook elements for cooperation with a corresponding plurality of engagement elements with the hook elements spaced radially from the axis of rotation of the support member and turned in one rotary direction whereby the disk may be releasably mounted on the rotary support by simply pressing the disk against the working face of the rotary support and then rotating the disk slightly relative to the rotary support. Preferably the hook elements are turned in whichever rotary direction will cause the power-actuated rotation of the support to favor the mutual engagement of the hook elements and engagement elements. Thus if the hook elements are on the rotary support member, they are turned in the direction of power-actuated rotation of the support member. On the other hand, if the hook elements are on the disk member, they are turned in the rotary direction that is opposite to the direction of power-actuated rotation of the support member.

In some practices of the invention the rotary support member is in the form of a hollow hub with a working face and with the interior of the hub opening onto the working face. One of the two pluralities of mutually engaging members is inside the hollow hub and suitable resilient means is also inside the hollow hub to create the desired retaining pressure between the disk and the hub.

In some practices of the invention the resilient means for providing the retaining pressure comprises spring means or spring means and a cooperating plunger. In other practices of the invention the resilient means is an elastomer body. In this regard, a feature of one embodiment of the invention is that the hub itself is largely made of elastomer and an integral portion of the elastomer that provides at least a portion of the working face of the hub serves as the resilient means for creating the retaining pressure between the hub and a disk mounted thereon.

The engagement means may, for example, be radial pin means in the form of either a diametrical pin or a set of radial pins inside the hollow hub. The hook means may, for example, be in the form of slotted sheet metal tongues or may be in the form of bent wire elements.

A further feature of the invention is the concept of mounting a sheet metal stamping on the abrasive disk to provide one of the two cooperating pluralities of elements for releasably engaging the disk with the rotary support. This concept provides a disk construction that is simple and inexpensive and at the same time structurally efficient for its purpose.

The sheet metal stamping may be formed with two sets of tongues to engage the abrasive disk for uniting the stamping with the abrasive disk and these tongues may be arranged either on an inner circumference or on an outer circumference of the sheet metal stamping. In one practice of the invention additional slotted tongues of the stamping serve as the hook elements of the combination. In another practice of the invention a plurality of slots in the sheet metal stamping serve as the plurality of engagement means for engagement by hook elements. In still another embodiment of the invention the stamping is a U-shaped member with the two arms of the U-shaped member extending through apertures in the abrasive disk and with the ends of the two arms slotted to form the required hook elements.

The various features and advantages of the invention may be understood from the following detailed description and the accompanying drawings.

In the drawings, which are to be regarded as merely illustrative:

FIG. 1 is a perspective view of one embodiment of the invention showing a rotary hub member and a cooperating abrasive disk, the disk being shown separated from the hub member;

FIG. 2 is an axial section of the hub member of FIG. 1;

FIG. 3 is a view partly in side elevation and partly in section showing the abrasive disk mounted on the hub member;

FIG. 4 is a plan view of a sheet metal blank that may be formed into a stamping for mounting the abrasive disk on the hub structure;

FIG. 5 shows the configuration of the sheet metal stamping at an intermediate stage in the assembling of the sheet metal stamping to the abrasive disk, the abrasive disk being shown in section;

FIG. 6 is a side elevation showing the final configuration of the sheet metal stamping with the sheet metal stamping in permanent engagement with the backing sheet of an abrasive disk;

FIG. 7 is a fragmentary side elevation similar to FIG. 6 showing the completed abrasive disk wherein an abrasive sheet is bonded to the backing sheet;

FIG. 8 is a diametrical sectional view of a second embodiment of the invention in which the hub member is made in large part of an elastomer;

FIG. 9 is a perspective view of a sheet metal stamping that is used in the embodiment shown in FIG. 8, structure that is functionally associated with the sheet metal stamping being shown in phantom;

FIG. 10 is a plan view of a sheet metal blank that is employed in a third embodiment of the invention;

FIG. 11 is an exploded perspective view of the third embodiment of the invention;

FIG. 12 is a fragmentary sectional view showing how tongues of the sheet metal stamping engage the backing sheet of the abrasive disk; and FIG. 13 is a view partly in side elevation and partly in section showing the abrasive disk of the third embodiment of the invention mounted on the associated rotary support member.

The first embodiment of the invention illustrated by FIGS. 1–7 comprises a rotary hub member 20 and an abrasive disk 22 that is adapted to be replaceably mounted on the hub member. The hub member 20 may be made of rigid material such as metal and is formed with a shank or stub shaft 24 by means of which it may be mounted in and driven by a rotary power means.

The abrasive disk 22 is provided with a plurality of hook elements 25 for releasable engagement with corresponding engagement elements of the hub member 20, the engagement elements being in the form of a plurality of radial pins 26. The hook elements 25 are all radially spaced from the axis of the abrasive disk and are all turned in one rotary direction as may be seen in FIG. 1, so that the hook elements may be engaged with the radial pins 26 by relative rotation between the abrasive disk 22 and the hub member 20.

In the construction shown, the hook elements 25 are directed counter clockwise as viewed from the hub member so that the abrasive disk may be releasably mounted on the hub member by counter clockwise rotation relative thereto. This rotary direction in which the hook elements 25 point is the rotary direction that will cause the power-actuated rotation of the hub member to favor engagement of the hook elements with the radial pins. Thus in the first embodiment of the invention the power-actuated rotation of the hub member 20 is in the direction to urge the radial pins 26 into engagement with the hook elements 25, i.e. clockwise as viewed from the shank end of the hub member.

In this first embodiment of the invention the hub member 20 is of hollow construction, being formed with a deep concentric groove 27 to receive the hook elements 25 and being further formed with a blind axial bore 28. Thus the groove 27 and the bore 28 from concentric outer and inner walls 29 and 30 respectively, the inner wall being shorter than the outer wall and the rim 31 of the outer wall forming what may be termed the operating face of the hub member on which the abrasive disk 22 is to be releasably mounted. Preferably, the rim 31 is internally chamfered as indicated at 32.

It is contemplated that suitable resilient means will be included to provide pressure betwen the hub member 20 and the mounted disk 22 to yieldingly retain the hook elements 25 in engagement with the radial pins 26. In this first embodiment of the invention the resilient means comprises a coil spring 35 and a cooperating plunger 36, the spring urging the plunger outward to resist the axial movement of the disk 22 that is required to bring the hook elements 25 into engagement with the radial pins 26 of the hub member. In this regard, a feature of this first embodiment of the invention is that the pins 26 which extend radially across the concentric slot 28 have the additional function of cooperating with the plunger 36 to limit the outward movement of the plunger and thus retain the plunger in the hub member when the disk 22 is separated from the hub member. For this purpose the radial pins 26 project inwardly into sliding engagement with corresponding short longitudinal slots 38 in the periphery of the plunger 36. In the absence of an abrasive disk 22, the longitudinal slots 38 permit the plunger 36 to protrude slightly from the working face of the hub member as shown in FIG. 2.

The abrasive disk 22 is preferably of laminar construction comprising a circular abrasive sheet 40 and a coextensive circular backing sheet 42, the two sheets being adhesively bonded together. The abrasive sheet 40 may, for example, be made of emery cloth or sandpaper and the backing sheet 42 may, for example, be made of cardboard or fibre board. The hook elements 25 may be mounted on such a laminar abrasive disk in various ways in various practices of the invention.

A feature of this first embodiment of the invention is the incorporation of a sheet metal stamping 44 in the structure of the abrasive disk 22 to provide the required hook elements 25. The sheet metal stamping 44 is formed from a sheet metal blank that is designated 44a in FIG. 4. The blank 44a comprises essentially a sheet metal disk with three equally spaced radial tongues 25, each tongue being formed with an inclined slot 46 to provide the required hook configuration. The central area of the blank 44a is cut along intersecting lines 47 to form a circular series of radially inward tongues 48.

The first step in the fabrication of a sheet metal stamping 44 from a blank 44a is to turn the tongues 48 of the blank outward 90° in one direction and to turn the tongues 25 of the blank outward 90° in the opposite direction, the resulting configuration of the sheet metal being shown in FIG. 5. The circular backing sheet 42 has a concentric circular aperture 50 through which the tongues 48 are first extended as shown in FIG. 5 and then are flattened back against the underside of the backing sheet as indicated in FIG. 6. Thus the tongues 48 in their final bent configurations effectively interlock the sheet metal stamping 44 with the backing sheet 42. The final step in the fabrication of the abrasive disk 22 is to bond the back side of the circular abrasive sheet 40 to the backing sheet 42 by a layer of adhesive material 52 thus uniting the two circular sheets with the sheet metal tongues 48 covered by the abrasive sheet.

The hook elements 25 are dimensioned in length to hold the abrasive disk 22 in abutment against the operating face, i.e. against the rim 31 of the outer concentric wall 27. Consequently the abrasive disk must be flexed inwardly of the hub member 20 beyond the plane of the rim 31 to permit the hook elements 25 to engage the radial pins 26. For this purpose the outside diameter of the finished sheet metal stamping 44 is substantially smaller than the inside diameter of the outer concentric wall 29; the outer concentric wall has the chamfer 32 and the inner concentric wall is set back from the plane of the rim 31 of the outer concentric wall. Thus the rotary hub member 20 may be aptly described as being centrally recessed to permit inward flexure of the central area of the abrasive disk 22.

The manner in which this first embodiment of the invention serves its purpose may be readily understood from the foregoing description. To mount the abrasive disk 22 on the hub member 20, it is merely necessary to position the abrasive disk concentrically of the operating face of the hub member against the extended plunger 36, press the abrasive disk toward the hub member to flex the central area of the abrasive disk inward to retract the extended plunger against the resistance of the coil spring 35 and then to rotate the abrasive disk relative to the hub structure to cause the hook elements 25 to engage the radial pins 26. When the abrasive disk 22 is then released from manual pressure the plunger 36 is urged outward by the coil spring 35 to create separation force between the abrasive disk and the hub member to retain the hook elements 25 in engagement with the radial pins 26.

In the course of applying the mounted abrasive disk 22 to a surface of a work piece, the plunger 36 may be retracted to some degree inadvertently. The abrasive disk is not released, however, because the frictionally engendered resistance to rotation of the abrasive disk by the rotary hub member is in the rotary direction to favor engagement of the hook elements 25 with the radial pins 26.

To release a abrasive disk 22, it is merely necessary to reverse this procedure. The abrasive disk is pressed inward to release the hook elements 25 from the radial pins 26 and then the abrasive disk is rotated slightly and released.

It is apparent that the cost of the materials for the three-piece abrasive disk 22 is exceedingly low. It is further apparent that the sheet metal stamping 44 may be produced in the configuration shown in FIG. 5 by automatic punch press operations and that the sheet metal stamping may be assembled to the backing sheet 42 by automatic mechanism to keep the assembly cost of the abrasive disk 22 exceedingly low.

The second embodiment of the invention shown in FIGS. 8 and 9 comprises the same basic combination of a rotary support or hub member, generally designated 60, and an abrasive disk, generally designated 62, the abrasive disk comprising the usual circular abrasive sheet 64 bonded to a circular backing sheet 65. The feature of this embodiment of the invention is that the rotary support 60 is largely made of an elastomer for resilient flexibility.

In the construction shown, the rotary support 60 comprises a metal hub body 66 and a flange 68 of rubberlike material united with the hub body and extending radially therefrom, the flange being tapered towards its outer circumference as indicated in FIG. 8. The elastomer flange 68 may be bonded to the hub body 66 by molding the flange to the hub body, the peripheral surface of the hub member being roughened to make the bond more effective. The hub body 66 has the usual axial shank or integral shaft 70 and the hub body 66 and the flange 68 have coplanar surfaces which form an operating face 72 of the hub member on which the abrasive disk 62 is to be releasably mounted.

In this second embodiment of the invention, a pair of oppositely directed hook elements 74 of the abrasive disk 62 enter a circular coaxial recess 75 of the rotary support 60 for releasable engagement with a diametrical pin 76. The diametrical pin 76 has two radial portions 78 in the coaxial recess 75 for engagement by the two hook elements 74 respectively.

Any suitable resilient means may be provided to create the desired retaining force between the rotary support 60 and the abrasive disk 62. In the construction shown the resilient means is in the form of a concentrically positioned elastomer body 80 that is positioned in the circular recess 75 concentrically thereof with the diametrical pin 76 extending through the elastomer body. In the absence of the abrasive disk 62, the elastomer body 80 protrudes outward beyond the plane of the operating face 72. When the abrasive sheet 62 is mounted on the operating face it compresses the elastomer body 80 axially to create the desired retaining force.

In this second embodiment of the invention the hook elements 74 are the two legs of a U-shaped sheet metal stamping 82. In the procedure of assembling the abrasive disk 62 to the hub member 60, the two legs of the sheet metal stamping 82 are first inserted through corresponding elongated apertures 84 in the backing sheet 65 and then the circular abrasive sheet 64 is adhesively bonded to the backing sheet to complete the assembly. It is apparent that the cost of the materials of the abrasive disk 62 and the cost of assembly of the abrasive disk are even lower than the material and assembly cost of the abrasive disk 22 of the first embodiment of the invention.

Since it is contemplated that the hook elements 74 will be dimensioned to hold the abrasive disk 62 against the operating face 72 of the rubber-like flange 68, here again the central area of the abrasive disk must be flexed inwardly of the hub member 60 beyond the plane of the operating face to permit the hook elements to engage the diametrical pin 76. For this reason the rim face 85 of the hub body 66 is spaced inwardly from the plane of the operating face 72. It is to be noted that the rubber-like material of the flange 68 yields to lessen the extent to which the central area of the abrasive disk 62 must be flexed for engagement of the hook elements 74 with the diametrical pin 76.

In the second embodiment of the invention the manual manipulation for mounting the abrasive sheet 62 on the rotary support structure 60 is the same as in the first embodiment of the invention. This second embodiment of the invention has an added advantage in that the tapered elastomeric flange 68 yieldingly reinforces the abrasive disk with the yielding resistance of the elastomeric flange desirably decreasing toward the outer circumference of the abrasive disk.

As shown in FIG. 13, the third embodiment of the invention comprises the basic combination of a rotary support structure 90 and an abrasive disk 92 that is adapted to be replaceably mounted on the rotary support structure. As best shown in FIG. 11 the rotary support structure 90 comprises a bell shaped body 94 of elastomer with one end of a shank member 95 embedded therein, the elastomer body being molded to the shank member. The elastomer body 94 has a planar operating face 96 and two hook elements 98 protrude from the operating face. The hook elements 98 are the opposite angular ends of a single U-shaped wire 100 that is embedded in the elastomeric body 94 in the manner indicated in FIG. 13.

As best shown in the exploded view in FIG. 11, the abrasive disk 92 comprises the usual basic combination of a circular abrasive sheet 102, a circular backing sheet 104 and a sheet metal stamping, generally designated 105. The sheet metal stamping 105 may be formed from a flat sheet metal blank in the form of a disk 105a shown in FIG. 10. The sheet metal disk 105a has two diametrically opposite elongated apertures or slots 106 to receive the two hook elements 98 for engagement of the sheet metal stamping 105 by the hook elements. The sheet metal blank 105a is provided with a series of radial cuts 108 in its peripheral margin which form a first circular series of radial tongues 110 and a second alternate circular series of radial tongues 112.

The first step in forming the sheet metal stamping 105 from the blank 105a is to bend the peripheral tongues 110 downward 90° as indicated in FIG. 11 and to bend the alternate peripheral tongues 112 to the angular configuration shown in FIG. 11. The next step is to insert circular series of downwardly bent tongues 110 into a circular series of corresponding slots 114 in the backing sheet 104 to position the angular tongues 112 against the upper surfaces of the backing sheet as shown in FIG. 13. The lower ends of the downwardly bent tongues 110 are then bent upward and radially outward against the underside of the backing sheet 104 in the manner indicated in FIG. 12. This step clamps the backing sheet 104 between the two sets of tongues 110 and 112 for effectively uniting the sheet metal stamping with the backing sheet.

The final step in the assembly of the abrasive disk 92 is to bond the abrasive sheet 102 against the backing sheet in the manner indicated in FIG. 13 to conceal the bent ends of the tongues 110. The tongues 112 by virtue of their angular configuration serve as means to space the central area of the sheet metal stamping 105 from the surface of the backing sheet 104 to provide space for the ends of the hook elements 98 to extend between the sheet metal stamping and the backing sheet.

A feature of this last embodiment of the invention is that the one-piece elastomeric body 94 which provides the operating face 96 also provides the required retaining force between the abrasive disk and the rotary support structure 90. For this purpose the U-shaped wire 100 is embedded in the elastomeric body 94 with slightly less of the hook elements 98 exposed than is required for free engagement of the hook elements with the sheet metal stamping 105. By virtue of this construction the elastomeric body 94 must be at least slightly elastically distorted for the hook elements 98 to enter into engagement with the sheet metal stamping 105, the distortion of the elastomeric body providing the required retaining force.

Here again the hook elements 98 are turned in a rotary direction for engagement of the abrasive disk with the rotary support structure by rotation of the abrasive disk relative to the support structure. Unlike the hook elements 25 of the first embodiment of the invention and the hook elements 74 of the second embodiment of the invention, the hook elements 98 of the third embodiment of the invention are on the rotary support structure instead of being on the abrasive disk. Therefore, the hook elements 98 are directed contrary to the direction of power actuated rotation of the rotary support structure 90 so that such rotation will favor the engagement of the hook elements with the cooperating elements, i.e. with the ends of the two slots 114.

My description in specific detail of the selected embodiments of the invention will suggest various changes, substitutions and other departures from my disclosure within the spirit and scope of the appended claims.

I claim:
1. An abrasive device comprising:
   a rotary support member having an operating face and having a recess within the operating face;
   abrasive disk means;
   hook means on said abrasive disk means;
   complementary engagement means supported by the rotary support member and extending across the recess in the rotary support member for releasable engagement by said hook means to hold the disk means adjacent said operating face of the support member; and
   yielding means supported by the support member and extending beyond the operating face of the rotary support member to create pressure between said rotary support member and said abrasive disk means to yieldingly maintain said rotary support member and said abrasive disk means in mutual engagement.
2. An abrasive device as set forth in claim 1 wherein said support member is centrally recessed to permit inward flexure of the central region of the abrasive disk for engaging said hook means with said complementary engagement means.
3. An abrasive device as set forth in claim 1 wherein:
   said hook means comprises a plurality of hook elements positioned radially outward from the axis of rotation of the two members,
   all of said hook elements being pointed in a given rotary direction for engagement with the engagement means by relative rotation between the two members,
   said rotary direction being the rotary direction to cause the resistance to rotation of the abrasive disk means by the support member to favor engagement of the hook elements with the engagement means.
4. An abrasive device as set forth in claim 3 wherein:
   said rotary support member comprises a hub and a tapered elastomer flange extending radially outward from the hub;
   said hub and flange having surfaces forming said operating face.
5. An abrasive device comprising:
   a rotary support member having an operating face and including a rotary shaft and having a recess in a direction corresponding to the direction of the shaft;
   an abrasive disk member including an abrasive sheet and a backing sheet bonded to the abrasive sheet and further including means supporting the abrasive sheet and the backing sheet;
   first engagement means on the rotary support member and extending across the recess in a direction having a major component transverse to the direction of the shaft;
   complementary engagement means on the supporting means of the abrasive disk member for releasable engagement with said first engagement means to hold the disk member adjacent said operating face of the support member; and
   resilient means on said rotary support member and extending beyond the operating face of the support member to yieldingly oppose movement of said disk member into engagement with the rotary support member thereby to exert pressure on the disk member to keep the disk member engaged with the rotary support member.
6. An abrasive device comprising:
   a hollow hub member having an operating face and having a recess;
   an abrasive disk;
   a plurality of hook elements;
   a corresponding plurality of engagement elements for releasable engagement by said hook elements to hold said disk member adjacent said operating face,
   a first one of said plurality of hook and engagement elements being inside said hollow hub member and extending across the recess in the member, the other of said plurality of hook and engagement elements being on said disk,
   said hook elements being spaced radially from the axis of rotation of the hub member and all being turned in the same direction for engagement of the hook elements with the engagement elements by rotation of the disk relative to the hollow hub member,
   said hook elements being turned in the rotary direction to cause the resistance to rotation of the disk member by the hub member to favor engagement of the hook elements with the engagement elements; and
   resilient means disposed within the recess in said hub structure and extending beyond the operating face of said hub member and supported by the first one of said plurality of hook and engagement elements to yielding oppose movement of said disk into hooked position thereby to exert pressure on the hooked disk to keep the disk hooked.
7. An abrasive device as set forth in claim 6 wherein:
   said engagement elements comprise radial pin means disposed within the recess inside said hollow hub structure and extending across the recess in a direction having a major component transverse to the operating face of the hub member and into the walls of the hub member.
8. An abrasive device as set forth in claim 7 wherein:
   said resilient means comprises an elastomer body.
9. An abrasive device including:
   a hollow hub member having an operating face and having a recess extending to the operating face;
   an abrasive disk;
   a plurality of hook elements;
   a corresponding plurality of engagement elements for releasable engagement by said hook elements to hold said disk member adjacent said operating face,
   a first one of said plurality of elements being inside said hollow hub member and extending across the recess in the hub member in a direction having a major component corresponding to that of said operating face, the other of said plurality of elements being on said disk,
   said hook elements being spaced radially from the axis of rotation of the hub member and all being turned in the same direction for engagement of the hook elements with the engagement elements by rotation of the disk relative to the hollow hub member,
   said hook elements being turned in the rotary direction to cause the rotation of the hollow hub member to favor engagement of the hook elements with the engagement elements;
   a plunger inside said hollow hub member for abutment against said disk; and
   yielding means inside said hollow hub member to urge said plunger against the mounted disk to keep the said hook elements yieldingly engaged with said engagement elements, the yielding means being operatively coupled to said first plurality of elements to limit the movement of the yielding means in the direction of the abrasive disk.
10. An abrasive device as set forth in claim 9 wherein:
    said hook elements are on the disk and wherein
    said engagement elements comprise pin means on the hub member and wherein the pin means engage said plunger and limit the outward movement of the plunger.
11. An abrasive device, including:
    a hollow hub structure having an operating face and having a recess in the operating face;
    engagement elements disposed within the recess of said hub structure and extending in a direction having a major component corresponding to that of said operating face;

an abrasive disk, there being apertures in said disk;

a U-shaped member having a pair of legs extending through the apertures in said disk and with the ends of the legs forming hooks for releasable engagement with said engagement elements to hold the disk adjacent said operating face; and resilient means supported by the hub structure within the recess and extending from the recess beyond the operating face of the hub structure to create pressure between the disk and the hollow hub structure to yieldingly maintain said hooks in engagement with said engagement elements.

12. An abrasive device, comprising:

a hub structure;

a support member for receiving the hub structure and holding the hub structure in fixed relationship to the member;

first engaging means on the hub structure;

second engaging means on the member for engaging the first engaging means and for holding the first engaging means and the second engaging means in fixed relationship;

a backing sheet having a plurality of spaced openings and having first and second opposite faces;

a plurality of tongues on the support member, first tongues in the plurality being disposed against the first face on the backing sheet and second tongues in the plurality extending through the openings in the backing sheet and being disposed against the second face of the backing sheet; and an abrasive sheet having first and second faces and having its first face attached to the second face of the backing sheet and having properties of providing an abrasive action at its second face.

13. An abrasive device, including:

a hub structure having an operating face with elastomeric properties;

a support member having a first face for disposition against the elastomeric face of the hub structure;

first engaging elements extending from the operating face of the hub structure;

second engaging elements extending from the first face of the support member for engagement with the first engaging elements to press the operating face of the hub structure against the first face of the support member;

a plurality of tongues extending from the support member in a direction corresponding substantially to the first face of the support member;

a backing sheet having first and second faces, there being openings in the backing sheet betweet the first and second faces, first tongues in the plurality being disposed against the first face of the backing sheet and second tongues in the plurality extending through the openings and being pressed against the second face on the backing sheet; and an abrasive sheet having first and second faces and having the first face attached to the second face of the backing sheet and having abrasive material disposed on the second face of the abrasive sheet.

14. An abrasive device, including:

a hollow hub structure having an operating face;

engagement elements inside said hub structure;

abrasive disk means including a backing member having at least first and second opposite surfaces and including an abrasive disk having an exposed face and having abrasive particles on the exposed face;

a formed member having two inner circumferential series of tongue portions, one series of tongue portions engaging the first surface of the backing member and the other series of the tongue portions engaging the second surface of the backing member, the formed member having a plurality of hook portions positioned to releasably engage said engagement elements to hold the abrasive disk means adjacent said operating face; and resilient means on said hub structure and extending beyond the operating face of the hub structure to exert pressure on said abrasive disk means to maintain said hooked portions in engagement with said engagement elements.

15. An abrasive device, including:

abrasive disk means including a backing member and an abrasive disk member, the backing member having at least first and second surfaces and the disk member having an exposed face with abrasive particles on the exposed face of the disk;

a hub member having an operating face;

a uniting member having two series of tongue portions with each series of the tongue portions engaging a different one of the first and second surfaces of the backing member for uniting the uniting member with the abrasive disk means;

engagement means on one of said hub and uniting members;

hook means on the other of said hub and uniting members for releasable engagement with said engagement means to hold the abrasive disk means adjacent said operating face of said hub member; and resilient means on one of said hub and uniting members to create pressure between the abrasive disk means and the hub member to yieldingly maintain said hook means in engagement with said engagement means.

16. An abrasive device as set forth in claim 15 wherein said resilient means is an elastomer means on said hub member and forms at least a part of said operating face.

17. An abrasive device as set forth in claim 15 wherein said hook means include a plurality of hook elements on said hub structure and wherein said engagement means includes a plurality of slots in said uniting member to receive said hook elements.

References Cited in the file of this patent

UNITED STATES PATENTS

| | | |
|---|---|---|
| 2,331,861 | Smith | Oct. 12, 1943 |
| 2,620,604 | Veit | Dec. 9, 1952 |
| 2,620,605 | Holford | Dec. 9, 1952 |
| 2,747,343 | Gellert | May 29, 1956 |
| 2,764,853 | Rhees | Oct. 2, 1956 |
| 2,781,618 | Larson | Feb. 19, 1957 |
| 2,789,402 | Tocci-Guilbert et al. | Apr. 23, 1957 |
| 2,839,879 | Eisenbeis | June 24, 1958 |

FOREIGN PATENTS

| | | |
|---|---|---|
| 1,247,374 | France | Oct. 24, 1960 |